(12) United States Patent (10) Patent No.: US 8,515,819 B2
Crucs (45) Date of Patent: Aug. 20, 2013

(54) IDENTIFYING PRODUCTS AND SERVICES BASED ON A BUDGET

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 178 days.

(21) Appl. No.: 13/005,580

(22) Filed: Jan. 13, 2011

(65) Prior Publication Data

US 2012/0185354 A1    Jul. 19, 2012

(51) Int. Cl.
*G06Q 30/00*    (2006.01)
(52) U.S. Cl.
USPC ........................................ 705/26.1; 705/27.1
(58) Field of Classification Search
USPC ....................................... 706/26.1; 705/27.1
See application file for complete search history.

(56) References Cited

U.S. PATENT DOCUMENTS

| | | | |
|---|---|---|---|
| 6,125,352 A * | 9/2000 | Franklin et al. ............... | 705/26.8 |
| 6,611,814 B1 * | 8/2003 | Lee et al. ...................... | 705/7.29 |
| 7,363,242 B2 | 4/2008 | Lewis et al. | |
| 2010/0153242 A1 | 6/2010 | Preston et al. | |
| 2010/0262534 A1 | 10/2010 | Kaufman | |
| 2011/0099063 A1 * | 4/2011 | Clemmons ................. | 705/14.49 |

OTHER PUBLICATIONS

Youngs, Laura. McClatchy Don't get trapped by holiday debt—Tribune Business News [Washington] Oct. 14, 2007, downloaded from ProQuestDirect on the Internet on Dec. 11, 2012, 3 pages.*

*Managing Home and Personal Finances*—Using the Internet to Help Manage Your Finances, Anonymous. Hoboken: John Wiley & Sons, Inc, 2009, downloaded from ProQuestDirect on the Internet on Apr. 10, 2013, 5 pages.*
Desktop Gift Finder, Apr. 7, 2011, 3 pages, http://reviews.cnet.com/2743-32250__7-949.html?finderId=16&tag=scrollNav;imgThumbContainer0.
Ebay categories, dehumidifier, Apr. 7, 2011, 7 pages, http://shop.ebay.com/?_from=R40&_trksid=p5197.m570.l1313&_nkw=dehumidifier&_sacat=See-All-Categories.
Get Slate from Chase, Dec. 13, 2010, 6 pages, http://www9.chasecreditcards.com/slatevisa?MSC=IQ14548634.

* cited by examiner

*Primary Examiner* — James Zurita
(74) *Attorney, Agent, or Firm* — Hahn Loeser & Parks LLP

(57) ABSTRACT

A system, a method, a server, a computer processing platform, and non-transitory computer-readable medium for enabling the identifying of products and services on-line based on a user budget. A financial budget is generated based on personal financial information provided by a user. Search criteria are generated based on the budget and product/service criteria provided by the user. A search engine is accessed to initiate an on-line search using the generated search criteria. Returned search results are processed to generate purchase recommendations for the user based on the budget and the product/service criteria. The purchase recommendations are sent to the user where the user may make a purchase request based on the recommendations. The purchase of a product or service may be facilitated in response to the purchase request and the budget may be updated based on the purchase.

12 Claims, 8 Drawing Sheets

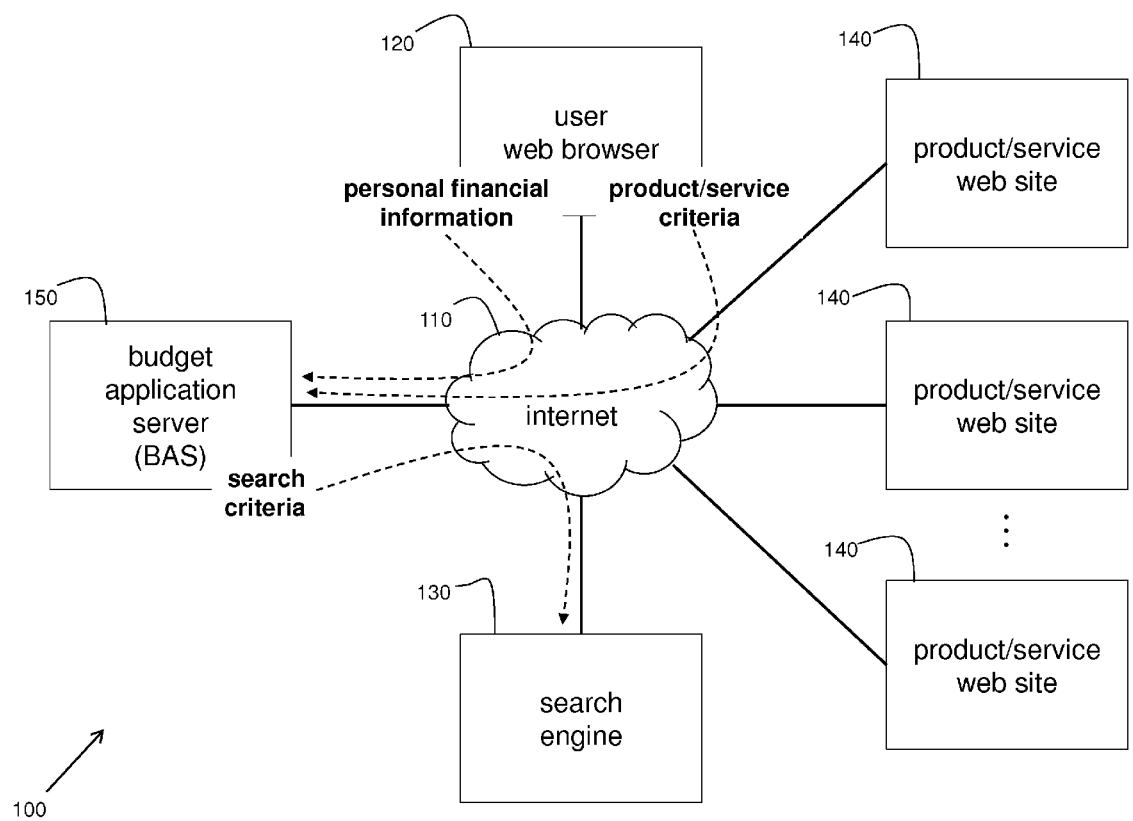

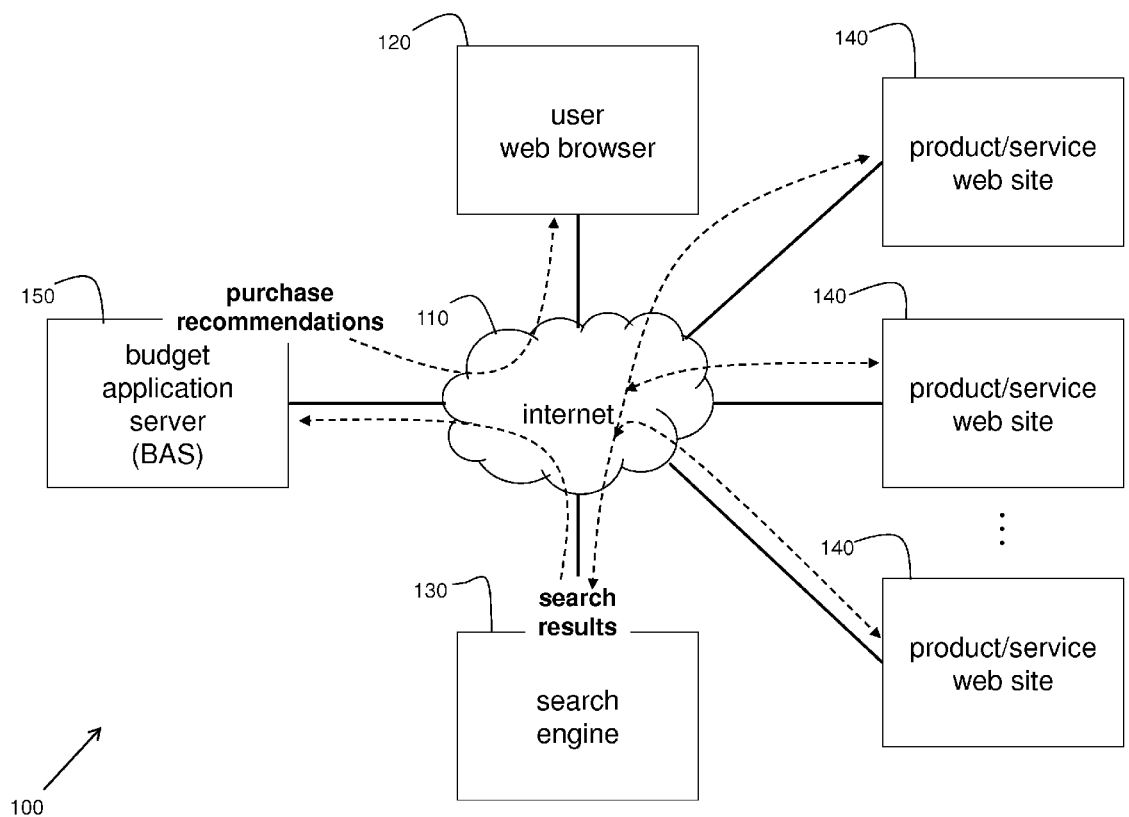

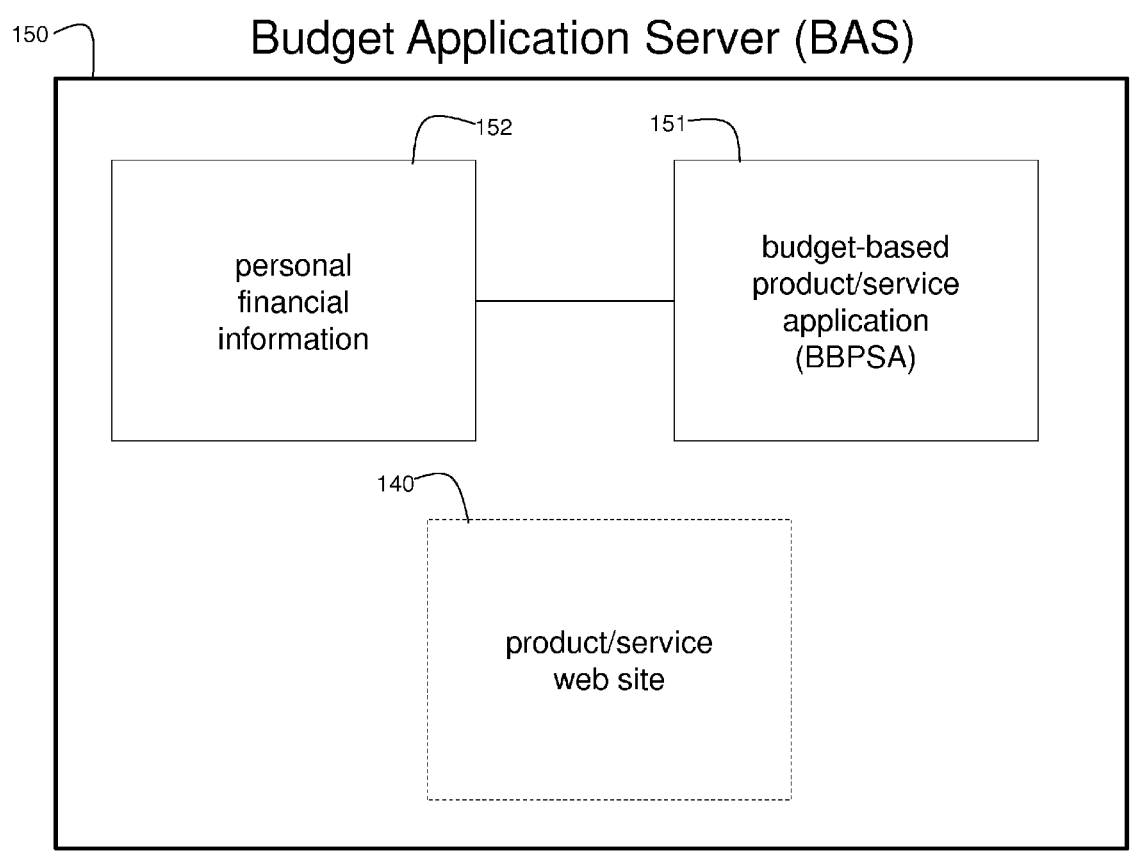

IDENTIFYING PRODUCTS AND SERVICES BASED ON A BUDGET

TECHNICAL FIELD

Certain embodiments of the present invention relate to on-line purchasing. More particularly, certain embodiments of the present invention relate to systems and methods to facilitate the purchasing of products and services based on a user's budget.

BACKGROUND

Today, when people shop on-line (i.e., over the internet), they are often overwhelmed with the number of choices of products and services that are available. An on-line shopper may have to sift through a large number of search results until he/she finds a product or service that is appropriate for them. Also, the shopper may not be sure if he/she can actually afford a particular product or service when found. Furthermore, the shopper may not be aware of various tradeoffs (e.g., between quality and price) for a particular type of product or service of interest. A need exists to provide on-line consumers with product and service choices that meet the needs of consumers, do not overwhelm consumers, and do not entice consumers to overextend themselves financially.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention facilitate the on-line purchasing of products and services by a user, taking into account whether or not the user can financially afford to purchase a particular type of product or service, by trying to identify products and services that are compatible with a financial budget of the user.

An embodiment of the present invention comprises a non-transitory computer-readable medium having computer-executable instructions for enabling the on-line performance of a method of identifying products and services based on a user budget. The method includes generating a financial budget based on personal financial information provided by a user. The personal financial information may include an income of the user, expenses of the user, and debt of the user. The method further includes generating search criteria based on the budget and product/service criteria provided by the user. The product/service criteria may include, for example, a product type or a service type, a preferred manufacturer, a preferred service provider, a size restriction, a weight restriction, and a color. The method also includes accessing a search engine to initiate an on-line search using the generated search criteria. The method further includes processing returned search results from the on-line search to generate purchase recommendations for the user based on the budget and the product/service criteria and sending the purchase recommendations to the user. The method may also include receiving a purchase request from the user in response to the purchase recommendations and facilitating an on-line purchase of a product or a service based on the purchase request. The method may further include updating the financial budget based on the on-line purchase.

Another embodiment of the present invention comprises a computer processing platform for enabling the identifying of products and services on-line based on a user budget. The computer processing platform includes means for generating a financial budget based on personal financial information provided by a user. The computer processing platform further includes means for generating search criteria based on the budget and product/service criteria provided by the user. The computer processing platform also includes means for accessing a search engine to initiate a search using the generated search criteria. The computer processing platform further includes means for processing returned search results from the search to generate purchase recommendations for the user based on the budget and the product/service criteria, and means for sending the purchase recommendations to the user. The computer processing platform may also include means for receiving a purchase request from the user in response to the purchase recommendations, means for facilitating an on-line purchase of a product or service based on the purchase request, and means for updating the financial budget based on the on-line purchase.

A further embodiment of the present invention comprises a server for enabling the identifying of products and services on-line based on a user budget. The server hosts computer-executable instructions including a budget-generating software module configured to generate a financial budget based on personal financial information provided by a user and configured to update the budget based on user on-line purchases. The computer-executable instructions further include a search criteria-generating software module configured to generate search criteria based on the budget and product/service criteria provided by the user. The computer-executable instructions also include a search results processing software module configured to process returned search results from an on-line search engine to generate purchase recommendations for the user based on the budget and the product/service criteria. The computer-executable instructions may further include a communication interface software module configured to facilitate communication with at least one user web browser, at least one search engine, and at least one product/service web site, via the internet. The computer-executable instructions may also include a purchasing software module configured to facilitate the on-line purchasing of a product or service based on a purchase request from the user. The server may also host a product or service web site.

Another embodiment of the present invention comprises a system for enabling the identifying of products and services on-line based on a user budget. The system includes a budget application server hosting a budget-based product/service software application and storing financial information of at least one user. The budget-based product/service software application includes a budget-generating software module, a search criteria-generating software module, a search results processing software module, a purchasing software module, and a communication interface software module. The system further includes at least one search engine and at least one product or service web site hosted on a web server. The budget application server, the at least one search engine, and the at least one product or service web site are configured to communicate with each other via the interne. The product or service web site may be configured with product or service data that are compatible with finable data fields of the search results processing software module. The system may also include at least one web browser hosted on a computer.

These and other advantages and novel features of the present invention, as well as details of illustrated embodiments thereof, will be more fully understood from the following description and drawings.

BRIEF DESCRIPTION OF THE DRAWINGS

FIGS. 1A-1D illustrate a block diagram of an example embodiment of a system for enabling the identifying of products and services on-line based on a financial budget for a user, showing the communication of various types of information between various elements of the system;

FIG. 2 illustrates a functional block diagram of an example embodiment of a budget application server of the system of FIGS. 1A-1D;

DETAILED DESCRIPTION

Figure 1A:
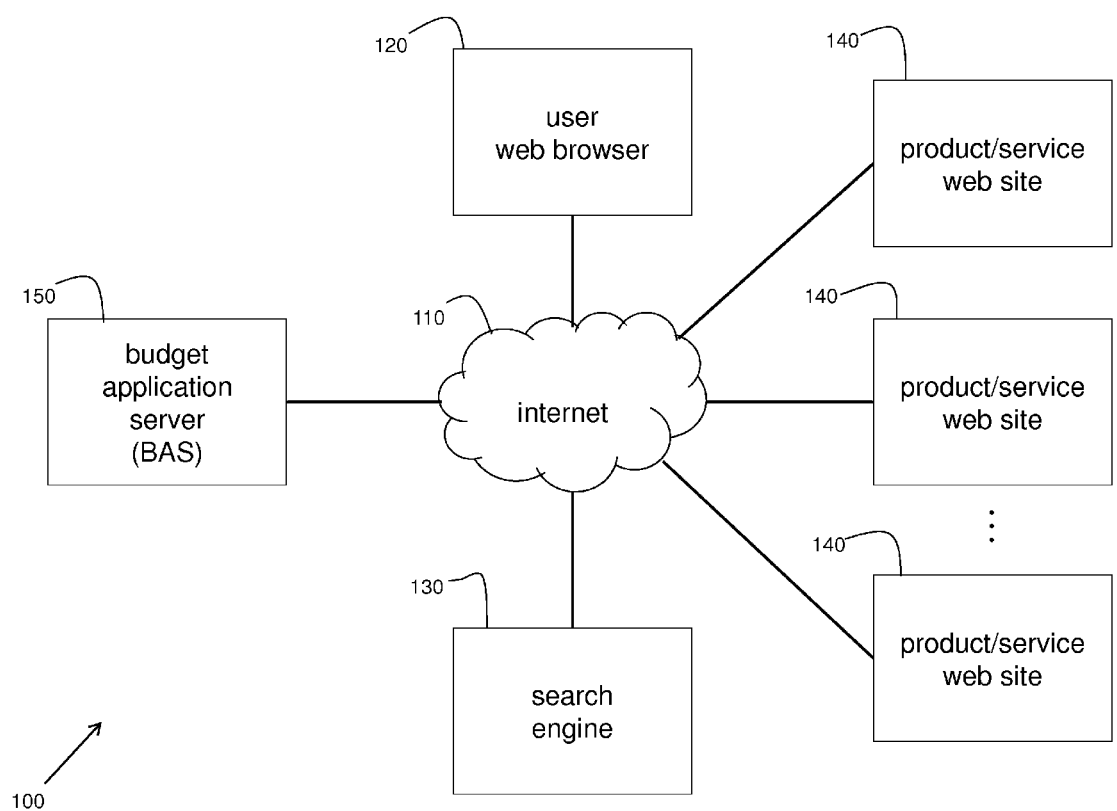
Figure 1D:
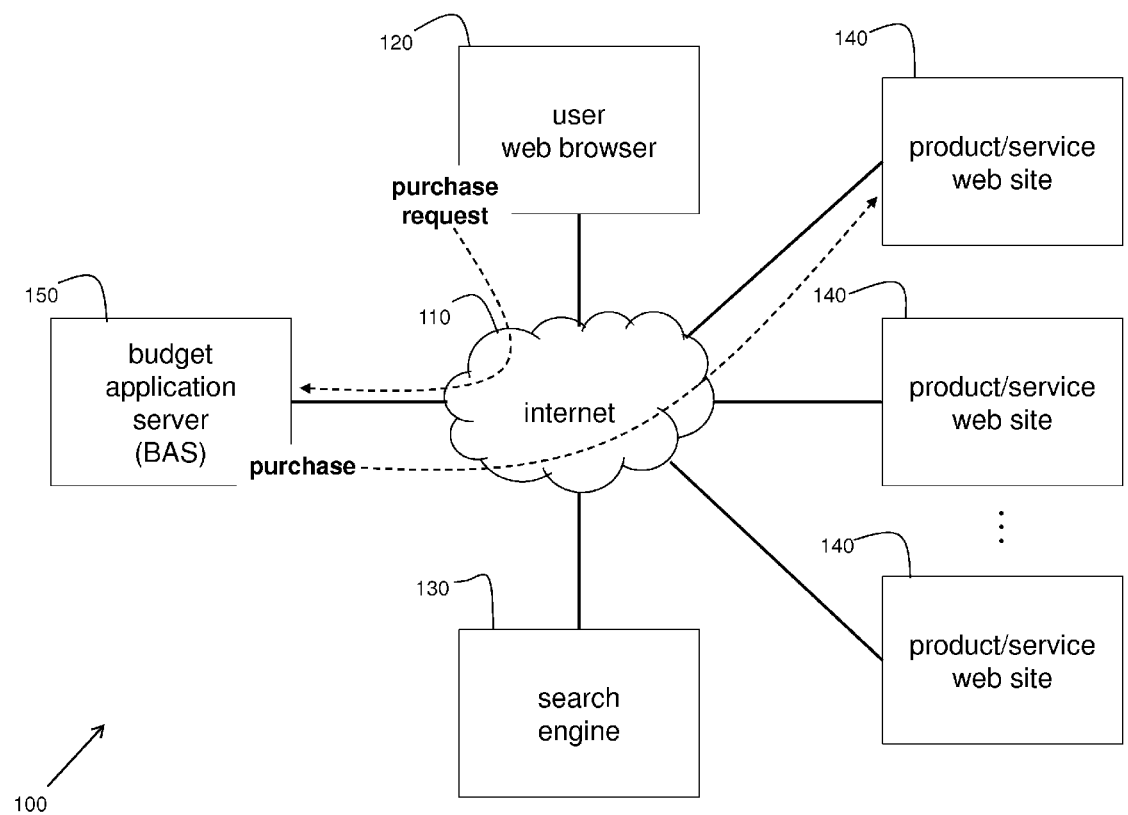

The terms "product" and/or "product/service" is used herein to generically refer to either a product or a service. The term "computer processing platform", as used herein, means a hardware platform having at least one processor, and which is programmed to execute software instructions. The term "server", as used herein, generically refers to a combination of hardware and software configured to run as a service on a network, to serve the needs or requests of other programs (i.e., clients) which may or may not be running on the same computer hardware. The term "software module", as used herein, refers to a small self-contained program of computer-executable instructions that performs a defined function or functions and is intended to operate within a larger program suite of other software modules.

FIGS. 1A-1D illustrate a block diagram of an example embodiment of a system 100 for enabling the identifying of products and services on-line based on a financial budget for a user, showing the communication of various types of information between various elements of the system 100. The system 100 includes various components operationally connected to the internet 110. For example, the system 100 includes a user web browser 120 (e.g., hosted on a personal computer, not shown) which is used by a user to navigate the internet 110. The system 100 also includes a search engine 130 which may be accessed via the internet 110 to perform a web site search on the internet 110. The system 100 further includes a plurality of web sites 140 which may be accessed via the internet 110 to find products and services that are for sale using, for example, the search engine 130.

The system 100 also includes a budget application server (BAS) 150. In accordance with an embodiment of the present invention, the BAS 150 may be accessed by the user web browser 120 via the internet 110 to facilitate identifying a product and/or a service that the user may desire to purchase based on a financial budget of the user and based on the desired characteristics of the product or service as defined by the user (i.e., product/service criteria). The BAS 150 interacts with the search engine 130 via the internet 110 to find products and/or services that the user may be interested in purchasing and which the user can afford to purchase based on the user's budget. Details of this interaction are discussed later herein. In general, the BAS 150 functions as an intermediary between the user web browser 120 and the search engine 130 and web sites 140. The BAS 150 provides a user interface to the user web browser 120 to facilitate user interaction with the BAS 150.

FIG. 2 illustrates a functional block diagram of an example embodiment of a budget application server (BAS) 150 of the system 100 of FIGS. 1A-1D. The BAS 150 includes a budget-based product/service application (BBPSA) 151 which is a software application configured to run on the hardware of the BAS 150. The BAS 150 also stores personal financial information 152 of one or more users (i.e., clients). As an option, the BAS 150 may also host a product/service web site 140. This may be the case, for example, when the BAS 150 is owned and operated by the same business entity that owns and operates the product/service website.

Figure 3:
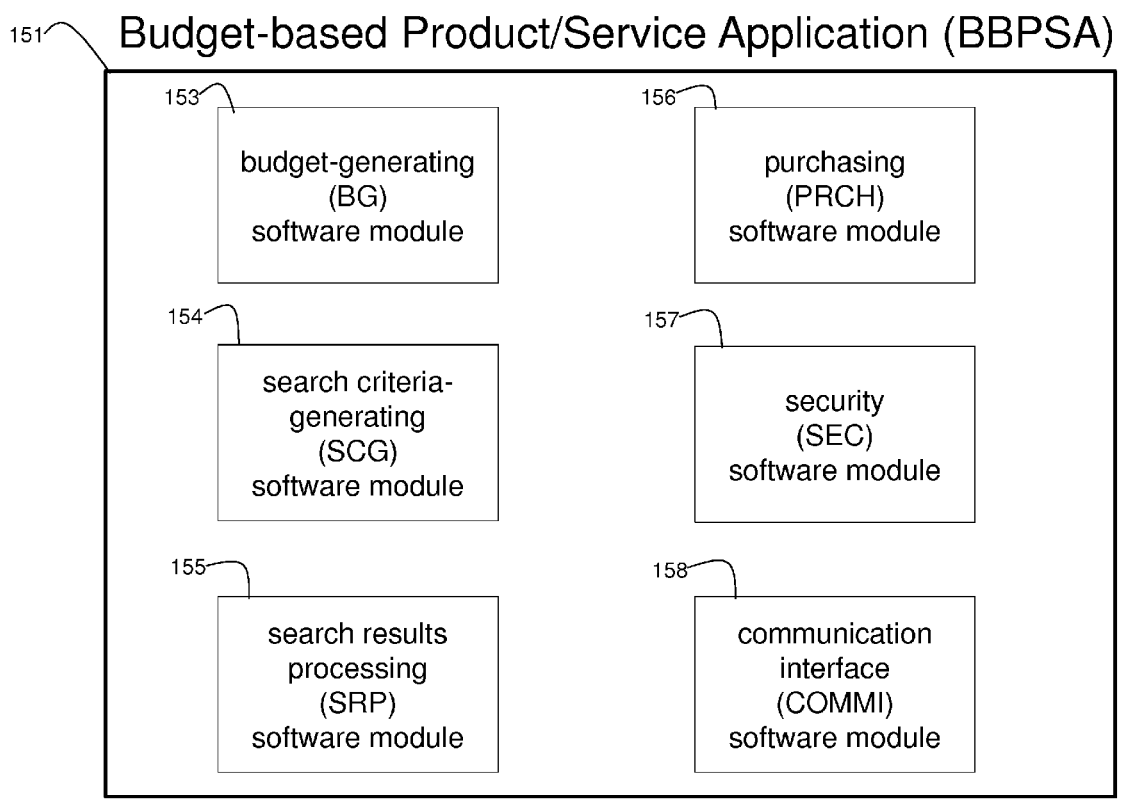
FIG. 3 illustrates a functional block diagram of an example embodiment of a budget-based product/service application hosted on the budget application server of FIG. 2.

FIG. 3 illustrates a functional block diagram of an example embodiment of a budget-based product/service application (BBPSA) 151 hosted on the budget application server (BAS) 150 of FIG. 2. The BBPSA 151 is made up of a plurality of software modules including a budget-generating (BG) software module 153, a search criteria-generating (SCG) software module 154, a search results processing (SRP) software module 155, a purchasing (PRCH) software module 156, a security (SEC) software module 157, and a communication interface (COMMI) software module 158. The software modules 153-158 may be organized and reconfigured (e.g., combined or split up) into other software modules, in accordance with other various embodiments of the present invention, while preserving the overall functionality of the BAS 150. In accordance with an embodiment of the present invention, the computer-executable instructions of the software modules 153-158 may be stored on a non-transitory computer-readable medium such as, for example, a magnetic disk, an optical disk, tape, RAM, ROM, CD-ROM, DVD, or any other type of removable or non-removable non-transitory medium which can be used to store the BAS 150.

The BG software module 153 functions to generate a financial budget based on the personal financial information 152 of a user. The BG software module 153 also functions to update the financial budget as the user's financial situation changes (e.g., as purchases are made, as user income changes, as user debt is paid down or accumulated, etc.). The SCG software module 154 functions to generate search criteria based on the budget of the user and further based on product/service criteria provided by the user. The search criteria may be used by the search engine 130 to search for products or services that are for sale via the product/service web sites 140. The SRP software module 155 functions to process returned search results from the on-line search engine 130 to generate purchase recommendations for the user, taking into account the user's budget and the product/service criteria defined by the user.

The purchasing (PRCH) software module 156 functions to facilitate the on-line purchasing of a product or service by the user based on a purchase request from the user in response to the purchase recommendations. The security (SEC) software module 157 functions to authenticate and authorize users to the BAS 150, and to maintain the personal financial information 152 of users as secure on the BAS 150. Such a SEC software module 157 may provide firewall capability, digital encryption capability, digital identification capability, as well as other on-line security measures. The communication interface (COMMI) software module 158 functions to facilitate communication between the BAS 150 and the user web browser 120, the search engine 130, and the product/service web sites 140 via the internet 110. For example, the COMMI software module 158 provides a user interface to the user web browser 120 to facilitate user interaction with the BAS 150. The communication interface (COMMI) software module 158 may also function to facilitate digital communication between the various other software modules 153-157 within the BAS 150.

Figure 4:
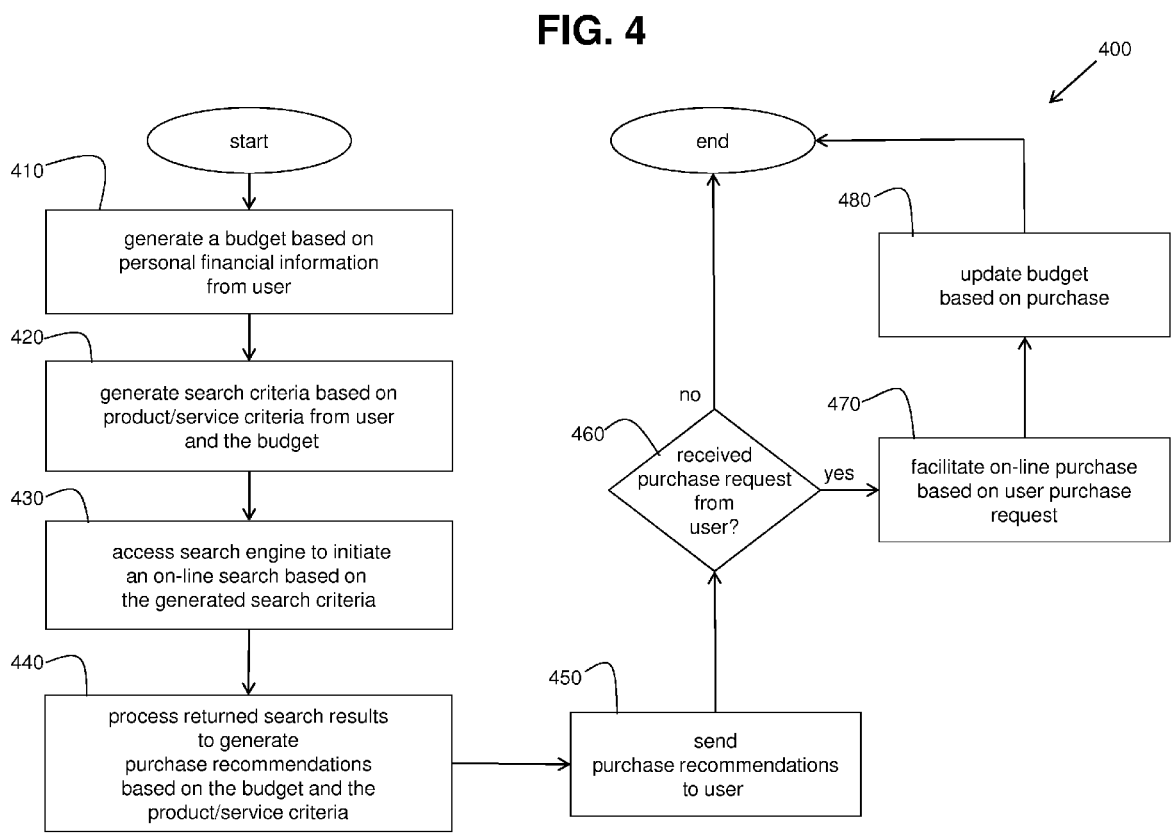
FIG. 4 is a flowchart of an example of an embodiment of a method of enabling the identifying of products and services on-line based on a user budget as implemented on the budget application server of FIG. 2 in the system of FIGS. 1A-1D.

FIG. 4 is a flowchart of an example of an embodiment of a method 400 of enabling the identifying of products and services on-line based on a user budget as implemented on the budget application server (BAS) 150 of FIG. 2 in the system 100 of FIGS. 1A-1D. In step 410, a budget is generated (e.g., by the BG software module 153 of the BAS 150) based on personal financial information (e.g., personal financial information 152) provided by a user (e.g., provided by the user web browser 120 to the BAS 150 via the internet 110). In step 420, search criteria are generated (e.g., by the SCG software module 154 of the BAS 150) based on product/service criteria provided by the user (e.g., provided by the user web browser 120 to the BAS 150 via the internet 110) and based on the budget generated in step 410.

In step 430, a search engine (e.g., search engine 130) is accessed (e.g., by the BAS 150 using the COMMI software module 158) to have a search performed (e.g., a search of the web sites 140) based on the generated search criteria generated in step 420. In accordance with an embodiment of the present invention, the BAS 150 takes into consideration the quality, reliability, and serviceability, of the available products or services such that the user does not have to spend time doing so. In step 440, search results that are returned from the search (e.g., from the search engine 130 to the BAS 150 via the internet 110) are processed to generate purchase recommendations (e.g., using the SRP software module 155 of the BAS 150) based on the budget generated in step 410 and the product/service criteria provided by the user. In step 450, the purchase recommendations are sent to the user (e.g., from the BAS 150 to the user web browser 120 via the internet 110).

In step 460, a determination is made as to whether or not a purchase request was received from the user (e.g., received by the BAS 150 from the user web browser 120 via the internet 110 after the user reviews the purchase recommendations). If a purchase request was not received, then the method 100 ends. However, if a purchase request was received then, in step 470, the on-line purchase (e.g., from one of the web sites 140) of a product or a service is facilitated (e.g., by the PRCH software module 156 of the BAS 150) based on a product or a service identified in the purchase request. In step 480, the budget is updated (e.g., by the BG software module 153 of the BAS 150) based on the resultant purchase. In accordance with an embodiment of the present invention, computer-executable instructions configured to implement the method 100 may be stored on a non-transitory computer-readable medium such as, for example, a magnetic disk, an optical disk, tape, RAM, ROM, CD-ROM, DVD, or any other type of removable or non-removable non-transitory medium which can be used to store computer-executable instructions configured to implement the method 100.

Figure 5:
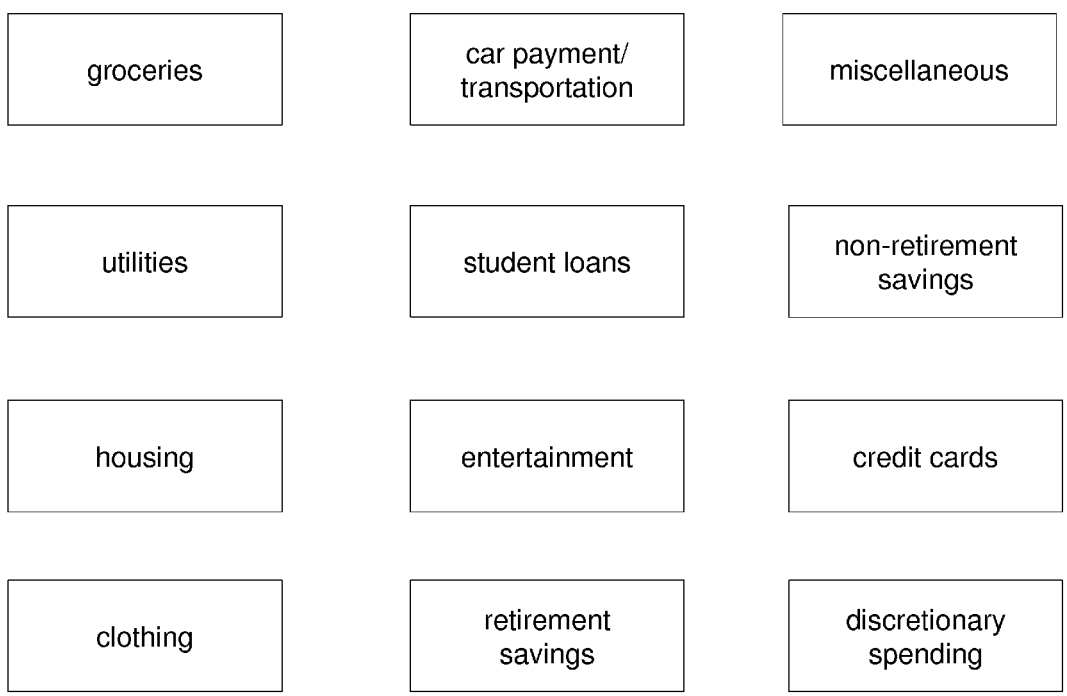
FIG. 5 illustrates an example embodiment of a plurality of budget categories of a budget formed by the budget application server of the system of FIGS. 1A-1D.

As an example of the method 400, referring to FIGS. 1B-1D and FIGS. 2-3, a user of a web browser 120 provides personal financial information 152 to the BAS 150 via the internet 110 (see FIG. 1B). The personal financial information 152 may include an income of the user as well as expenses and debt of the user. The BAS 150 generates a baseline budget for the user based on the personal financial information 152 of the user. The BAS 150 uses the BG software module 153 to generate the budget. FIG. 5 illustrates an example embodiment of a plurality of budget categories of a budget formed by the BAS 150 of the system 100 of FIGS. 1A-1D. The various categories in FIG. 5 represent placeholders or fields for allowable monthly expenditures by the user and expected monthly savings by the user. The categories include groceries, utilities, housing, clothing, car payment/transportation, student loans, entertainment, retirement savings, non-retirement savings, miscellaneous, credit cards, and discretionary spending. Other categories are possible as well.

In accordance with an embodiment of the present invention, the user may interact with the BG software module 153 using the web browser 120 to help generate the budget (e.g., by tweaking the allowed expense amounts in each category) while staying within the overall limits set by the BG software module 153 based on the personal financial information 152 of the user. For example, the user may decide to put more money toward entertainment by reducing the amount of money put towards clothing. Other tradeoffs and tweaks of the budget are possible as well. In accordance with an embodiment of the present invention, the personal financial information may only need to be provided once by the user and the financial budget may only need to be generated once. Afterwards, the budget is simply updated as purchases are made, for example, during a particular month, or as the monetary income, expenses, or debt of the user changes.

Continuing with the example, after the budget is generated, the user of the web browser 120 may provide product/service criteria to the BAS 150 via the internet 110 (see FIG. 1B). For example, the user may desire to purchase a dehumidifier for his home basement. The user accesses the BAS 150 via the web browser 120 and provides product criteria for the dehumidifier to the BAS 150. The product criteria may include, for example, product type (i.e., a dehumidifier), a preferred manufacturer, a size restriction, a weight restriction, a color, and a preferred use (e.g., to be used in a basement). Other product criteria may include a preferred consumer ranking, a preferred better business bureau (BBB) rating, a preferred seller, a local seller, and a preferred energy efficiency rating, for example.

Next, the SCG software module 154 takes the budget and the product criteria and generates search criteria to be used in searching for an appropriate dehumidifier. The generated search criteria may include terms such as "dehumidifier", "portable", "under $300.00", and "black". For example, the SCG software module 154 may have determined that, based on the user's budget, the user cannot afford to spend more than $300.00 at this time on a dehumidifier without having to dip into savings or go into debt, which may both be undesirable at this time, according to the budget.

The BAS 150 then accesses the search engine 130 via the internet 110 and provides the generated search criteria to the search engine 130 (see FIG. 1B). The search engine 130 may actually be more accurately described as a smart search engine or a decision engine if it is able to find and provide search results in a more intelligent manner than a simple key word search engine. The search engine 130 then performs a search of the product/service web sites 140 in an attempt to find a dehumidifier for sale that meets the requirements of the user, including the user's budget, based on the search criteria (see FIG. 1C).

The search engine 130 may also search for rating or ranking information associated with any identified dehumidifiers (e.g., a BBB rating, a Consumer Reports review, customer ratings, etc.). For example, the search engine 130 may link to a ratings database or a service that provides ranking information to refine the search results to provide the best matches for the user's requirements. The top (most relevant) search results from the web sites 140 are returned to the search engine 130 and are passed on from the search engine 130 to the BAS 150 (see FIG. 1C). In accordance with an alternative embodiment of the present invention, the search engine may be hosted on the BAS 150. This may be the case, for example, when the BAS 150 is owned and operated by the same business entity that owns and operates the search engine.

The returned search results are then processed within the BAS 150 by the SRP software module 155. The search results are analyzed, sorted, and parsed by the SRP software module 155 and information is extracted from the search results and formatted into a user-friendly purchase recommendation which can be provided to the user (see FIG. 1C). The processing analyzing, sorting, parsing, data extracting, formatting, etc.) performed by the SRP software module 155 is performed taking into account, again, the budget and the product criteria provided by the user. As a result, only the most appropriate information is provided to the user in the form of purchase recommendations. In accordance with an embodiment of the present invention, one or more of the product/service web sites are configured with product or service data that are compatible with fillable data fields of the SRP software module 155, thereby minimizing the amount of sorting, parsing, and data extraction that has to be performed on the search results from the web site.

In accordance with an alternative embodiment of the present invention, as part of processing the search results, the BAS 150 may link to a ratings database or a service that provides ranking information to refine the returned search results to provide the best matches for the user's requirements, for example, if this is not done by the search engine beforehand.

The purchase recommendations provide information on the dehumidifiers that are available for purchase on-line which best meet the user's criteria and which fit into the user's budget, as well as a recommendation on how to pay for the product/service (e.g., discretionary funds, credit card). However, in some instances, the recommendation may be to not make a purchase, for example, if none of the search results are close enough to meeting the user's requirements while staying within budget. Alternatively, the recommendation may be to wait a month or more to allow time for the user to accumulate the discretionary funds to make the purchase, or to allow current credit card debt to be paid down before making a new purchase.

For example, the purchase recommendations may include three different dehumidifiers. All three dehumidifiers meet the budget requirement of being under $300. The first dehumidifier costs $250 and meets all of the product criteria of the user except for the fact that the color is dark brown. The second dehumidifier costs $280 and meets all of the product criteria of the user except for the fact that the weight of the dehumidifier is 5 pounds heavier than the user's weight limit The third dehumidifier costs $220 and meets all of the product criteria of the user except for the fact that the manufacturer is not the preferred manufacturer.

As a result, the user reviews the purchase recommendations and decides to purchase the second dehumidifier for $280 which meets all of the user's criteria except that it is 5 pounds heavier than desired. The user, using the web browser 120, sends a purchase request to the BAS 150 via the internet 110 where the purchase request indicates to purchase the second dehumidifier of the purchase recommendations (see FIG. 1D). The PRCH software module 156 of the BAS 150 facilitates the purchase of the dehumidifier by accessing the appropriate web site 140 that is selling the second dehumidifier and automatically purchasing the second dehumidifier for the user (see FIG. 1D). For example, in accordance with an embodiment of the present invention, the PRCH software module 156 has access to credit card information of the user to be used in purchasing products and services. Such credit card information may be provided to the BAS 150 as part of the personal financial information 152 or as part of the purchase request, for example. Alternatively, some other monetary account may be used to make the purchase (e.g., a PayPal account). As a further alternative, the PRCH software module 156 of the BAS 150 may simply facilitate the manual on-line purchasing of the second dehumidifier by the user, allowing the user to interact with the product web site 140 through the BAS 150 to make the purchase.

Continuing with the example, once the purchase is made, the PRCH software module 156 communicates the details of the purchase to the BG software module 153 and the BG software module 153 updates the budget accordingly. For example, if the dehumidifier was purchased using a credit card, the $280 cost of the dehumidifier may be deducted from the allowable credit card expenses of the credit card expense category (see FIG. 5). Alternatively, $280 may be deducted from the discretionary spending category if the dehumidifier was purchased by debiting a cash account, for example. Other budget modifications to account for the $280 purchase are possible as well. The next time the user desires to make a purchase and provides product/service criteria to the BAS 150, the BAS 150 will be able to account for the fact that the user has $280 less to spend because of the updated budget. In accordance with an embodiment of the present invention, the BAS 150 may also track the shipping status of a purchased item, allowing the user to access the BAS 150 to view the status.

In summary, a system, a method, a server, a computer processing platform, and non-transitory computer-readable medium for enabling the identifying of products and services on-line based on a user budget are disclosed. A financial budget is generated based on personal financial information provided by a user. Search criteria are generated based on the budget and product/service criteria provided by the user. A search engine is accessed to initiate an on-line search using the generated search criteria. Returned search results are processed to generate purchase recommendations for the user based on the budget and the product/service criteria. The purchase recommendations are sent to the user where the user may make a purchase request based on the recommendations. The purchase of a product or service may be facilitated in response to the purchase request and the budget may be updated based on the purchase.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A system for enabling the identifying of products and services on-line based on a user budget comprising:
   a server including at least non-transitory computer-readable media, the non-transitory computer readable media storing computer executable instructions comprising:

a budget-generating software module configured to generate a budget based on personal financial information provided by a user and configured to update the budget based on at least one user on-line purchase, the at least one user on-line purchase is in at least one first budget category;

a search criteria-generating software module configured to generate search criteria based on the budget and product criteria provided by the user; and a search results processing software module configured to process returned search results from an on-line search engine to generate purchase recommendations for the user based on the budget and the product criteria, wherein the update to the budget based on the at least one user on-line purchase can include one or more adjustments to at least one second category.

2. The system of claim 1, the computer-executable instructions further comprising a communication interface software module configured to facilitate communication with at least one user web browser, at least one search engine, and at least one product web site, via the internet.

3. The system of claim 1, the computer-executable instructions further comprising a purchasing software module configured to facilitate the on-line purchasing of a product based on a purchase request from the user.

4. The system of claim 3, wherein the purchase request from the user is in response to at least one of the purchase recommendations.

5. The system of claim 4, the purchasing software module further configured to track a status of the product based on the on-line purchase.

6. The system of claim 5, wherein the status includes shipment tracking information.

7. The system of claim 1, wherein said server further hosts a product web site.

8. The system of claim 1, the search results processing software module further configured to generate purchase recommendations including a delay to a time of purchase based on the budget.

9. The system of claim 8, wherein the delay to the time of purchase facilitates one of a saving and a repayment of an amount associated with the budget.

10. The system of claim 1, wherein the product criteria includes at least one of a product type, a manufacturer, an intended use, an aesthetic aspect, and a spatial aspect.

11. The system of claim 10, wherein the spatial aspect includes at least one of one or more linear dimensions and a weight.

12. The system of claim 10, wherein the product criteria further includes at least one of a consumer ranking, an organizational rating, a seller location, a seller rating, and an environmental rating.

* * * * *

UNITED STATES PATENT AND TRADEMARK OFFICE
CERTIFICATE OF CORRECTION

PATENT NO. : 8,515,819 B2
APPLICATION NO. : 13/005580
DATED : August 20, 2013
INVENTOR(S) : Kevin M. Crucs It is certified that error appears in the above-identified patent and that said Letters Patent is hereby corrected as shown below:

In the Specification

Column 2; Line 60: delete "interne" and insert --internet--.

Column 2; Line 62: delete "finable" and insert --fillable--.

Column 7; Lines 14-16: delete "The processing analyzing, sorting, parsing, data extracting, formatting, etc.)" and insert --The processing (i.e., analyzing, sorting, parsing, data extracting, formatting, etc.)--.

Signed and Sealed this
Twenty-second Day of October, 2013

Teresa Stanek Rea
*Deputy Director of the United States Patent and Trademark Office*